US012049087B2

(12) United States Patent
Katano

(10) Patent No.: US 12,049,087 B2
(45) Date of Patent: Jul. 30, 2024

(54) LIQUID STORAGE UNIT

(71) Applicant: CANON KABUSHIKI KAISHA, Tokyo (JP)

(72) Inventor: Yu Katano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 45 days.

(21) Appl. No.: 17/983,742

(22) Filed: Nov. 9, 2022

(65) Prior Publication Data

US 2023/0066644 A1 Mar. 2, 2023

Related U.S. Application Data

(62) Division of application No. 17/167,571, filed on Feb. 4, 2021, now Pat. No. 11,524,501.

(30) Foreign Application Priority Data

Feb. 28, 2020 (JP) ................................ 2020-033478
Dec. 18, 2020 (JP) ................................ 2020-209977

(51) Int. Cl.
*B41J 2/175* (2006.01)

(52) U.S. Cl.
CPC .. *B41J 2/17513* (2013.01); *B41J 2002/17516* (2013.01)

(58) Field of Classification Search
CPC .................... B41J 2/17513; B41J 2002/17516
USPC ............................................................ 347/86
See application file for complete search history.

(56) References Cited

U.S. PATENT DOCUMENTS

| | | | | |
|---|---|---|---|---|
| 10,232,627 | B2 | 3/2019 | Toya et al. | |
| 10,500,866 | B2 | 12/2019 | Kawate et al. | |
| 2017/0341395 | A1 | 11/2017 | Toya et al. | B41J 2/1447 |
| 2018/0043694 | A1 | 2/2018 | Toya et al. | |
| 2018/0043695 | A1 | 2/2018 | Kawate et al. | |

FOREIGN PATENT DOCUMENTS

| | | |
|---|---|---|
| CN | 202782184 U | 3/2013 |
| JP | 2014-065279 | 4/2014 |
| JP | 2017-209947 | 11/2017 |
| JP | 2018-065374 | 4/2018 |
| WO | 2017/204072 | 11/2017 |

OTHER PUBLICATIONS

Office Action dated May 7, 2024 in counterpart Japanese Application No. 2020-209977, together with English translation thereof.

*Primary Examiner* — Jason S Uhlenhake
*Assistant Examiner* — Alexander D Shenderov
(74) *Attorney, Agent, or Firm* — Venable LLP

(57) ABSTRACT

The liquid storage unit includes a rectangular parallelepiped case having an open upper surface and a liquid storage pack including a rectangular parallelepiped adapter. The liquid storage pack is detachably housed in the case, the case includes a convex portion that protrudes from the inner side surface along a first direction perpendicular to a bottom surface, the adapter includes a concave portion that is formed on the outer side surface along a first direction and open to the lower surface, and the concave portion can engage with the convex portion in a second direction perpendicular to the first direction and parallel to the inner side surface, and is formed asymmetrically with respect to a surface that passes through the center of the adapter in the first direction and is perpendicular to the first direction.

5 Claims, 7 Drawing Sheets

LIQUID STORAGE UNIT

This application is a divisional of application Ser. No. 17/167,571 filed Feb. 4, 2021, currently pending; and claims priority under 35 U.S.C. § 119 from Japanese Patent Application No. 2020-209977 filed in Japan on Dec. 18, 2020 and from Japanese Patent Application No. JP 2020-033478 filed in Japan on Feb. 28, 2020; and the contents of all of which are incorporated herein by reference as if set forth in full.

BACKGROUND OF THE INVENTION

Field of the Invention

The present invention relates to a liquid storage unit.

Description of the Related Art

Some liquid ejection apparatuses such as an ink jet recording apparatus include a liquid storage pack storing a liquid such as ink inside a flexible flat bag body. In order to supply the liquid to the liquid ejection apparatus at a uniform concentration over time, such a liquid storage pack often employs a configuration in which a liquid intake port inside the bag body is arranged vertically asymmetrically when the liquid storage pack is placed in a case mounted on the main body of the device. In such a configuration, it is necessary to place the liquid storage pack in the case in a correct vertical direction. Japanese Patent Application Laid-Open No. 2018-65374 discloses a liquid storage pack that can easily recognize the vertical direction in which the liquid storage pack is to be housed in the case by providing a handle on one surface side of the bag body.

SUMMARY OF THE INVENTION

However, in the liquid storage pack disclosed in Japanese Patent Application Laid-Open No. 2018-65374, adding a handle not only increases the number of parts but also causes an increase in the size of the product.

Therefore, an object of the present invention is to provide a liquid storage unit capable of easily housing a liquid storage pack in a case in a correct direction without the need for additional parts.

In order to achieve the above-mentioned object, according to the present invention, there is provided a liquid storage unit including a case in which an opening is provided on one of rectangular parallelepiped maximum area surfaces, and a liquid storage pack that includes a flat bag body for storing a liquid and a rectangular parallelepiped adapter, and that is detachably mounted on an inside of the case through the opening, the adapter being attached to one end of the bag body and provided with a supply port of the liquid. Assuming that a direction connecting the opening of the case and a bottom surface facing the opening is a first direction, the adapter includes concave portions provided so as to extend in the first direction on opposite outer side surfaces, respectively, the outer side surface being a side surface continuous with a surface on which the supply port is provided, and not facing the bottom surface of the case, the case includes convex portions that complementarily fit to the concave portions on inner side surfaces of the case facing the outer side surfaces of the adapter on which the concave portions are provided, in a state in which the liquid storage pack is mounted, and an outer side surface region including the concave portion of the adapter and a side surface region including the convex portion of the case each have a structure in which one region and the other region are asymmetric with respect to a surface perpendicular to the first direction.

Further features of the present invention will become apparent from the following description of exemplary embodiments with reference to the attached drawings.

DESCRIPTION OF THE EMBODIMENTS

Hereinafter, embodiments of the present invention will be described with reference to the drawings. In the present specification, as a liquid storage unit of the present invention, a case in which ink (liquid) supplied to an ink jet recording apparatus (liquid ejection apparatus) is stored will be described as an example, but the use of the liquid storage unit is not limited thereto. The liquid storage unit of the present invention can also be used, for example, in various liquid ejection apparatuses that eject liquids other than ink. The “liquid” referred to here includes not only materials in a liquid phase state but also particles of functional materials made of solid substances such as pigments and metal particles dissolved, dispersed or mixed in a solvent. In addition, typical examples thereof include liquid crystals in addition to ink. Further, the “ink” referred to here is a pigment dispersed in a solvent as a precipitation component, and includes various liquid compositions such as gel inks and hot melt inks as well as general water-based inks and oil-based inks.

Figure 1:
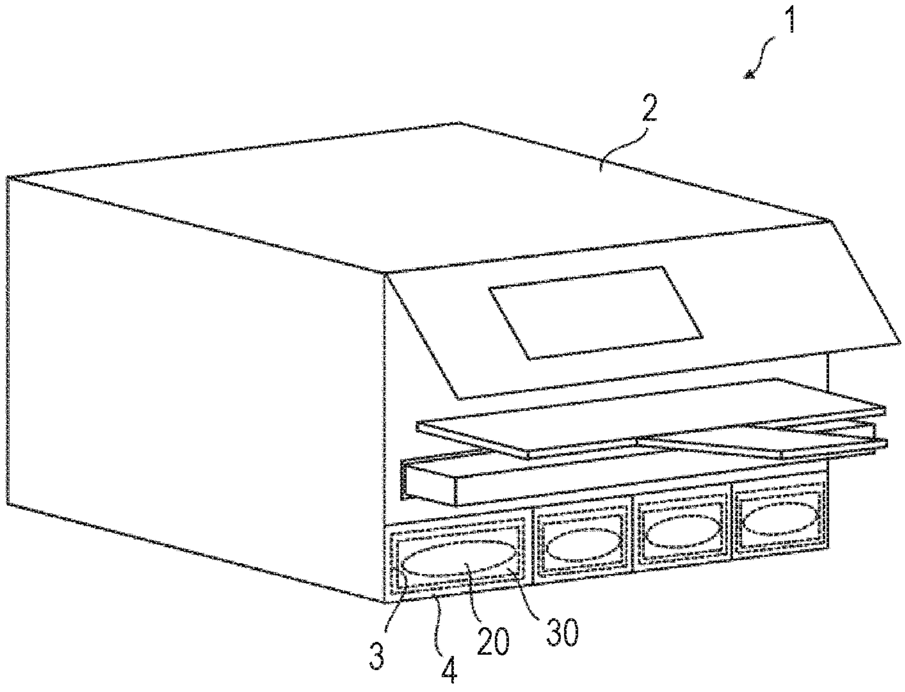
FIG. 1 is a perspective view of a liquid ejection apparatus in which a liquid storage unit of the present invention is used.

FIG. 1 is a perspective view of a liquid ejection apparatus in which a liquid storage unit of the present invention is used.

The liquid ejection apparatus 1 includes a rectangular parallelepiped housing 2 and a liquid ejection head (not illustrated) provided in the housing 2, and is an ink jet recording apparatus that ejects ink as a liquid from a liquid ejection head and records an image on a recording medium (not illustrated). The liquid ejection head may be a serial head that reciprocates in a direction intersecting a conveyance direction of the recording medium, or may be a line head fixed to the main body of the apparatus without reciprocating.

Further, the liquid ejection apparatus 1 includes a liquid storage pack 20 that stores the liquid supplied to the liquid ejection head, and a case 30 that detachably houses the liquid storage pack 20. The liquid storage pack 20 constitutes a liquid storage unit 10 (see FIG. 2) together with the case 30, and is inserted into a mounting portion 3 that is open to the front surface of the housing 2 to be detachably mounted in a state in which the liquid storage pack is housed in the case 30. The case 30 can be mounted on the mounting portion 3 even in a single state in which the liquid storage pack 20 is not housed. A plurality of mounting portions 3 (four in the illustrated example) is provided side by side in a width direction of the housing 2, and the opening of the mounting portion 3 is provided with a cover 4 that covers the mounting portion 3 so as to be openable and closable.

First Embodiment

Figure 2:
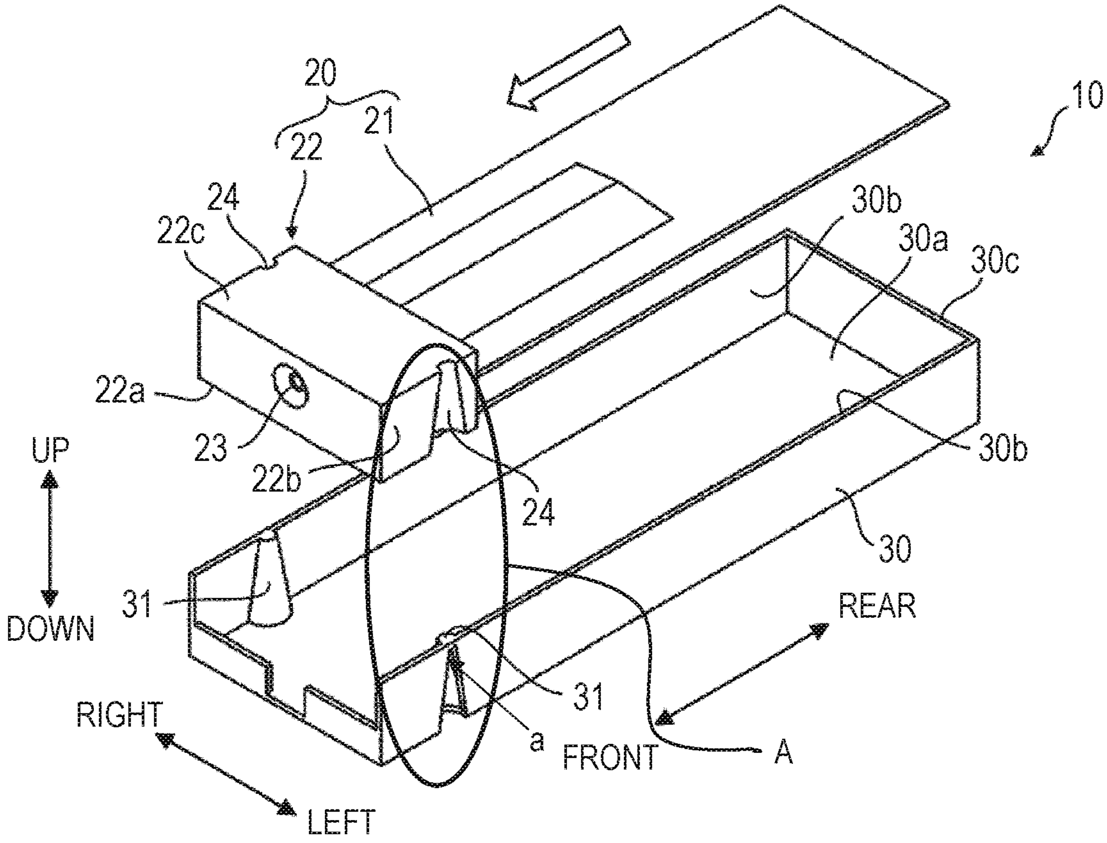
FIG. 2 is a perspective view of a liquid storage unit according to a first embodiment.

FIG. 2 is a perspective view of a liquid storage unit according to a first embodiment of the present invention, and illustrates a state in which a liquid storage pack is taken out of a case.

The liquid storage pack 20 includes a flat bag body 21 for storing a liquid and an adapter 22, and as described above, constitutes the liquid storage unit 10 together with the rectangular parallelepiped case 30 having an open upper surface. In the following description, for convenience, regarding the liquid storage pack 20 and the case 30, the downstream side in a mounting direction (see the white arrow in the drawing) with respect to the liquid ejection apparatus 1 along the long side of the case 30 is referred to as "front", and the upstream side thereof is referred to as "rear". Further, the left side in a right-left direction (short side direction of the case 30) when facing the mounting direction is referred to as "left" and the right side thereof is referred to as "right", and the upper side in a vertical direction (thickness direction of the bag body 21) when the case 30 is placed on a horizontal plane is referred to as "up", and the lower side thereof is referred to as "down".

The adapter 22 is a device for connecting the liquid storage pack 20 to the liquid ejection apparatus 1, and is attached to a front end portion (one end) of the bag body 21. The adapter 22 is formed in a rectangular parallelepiped shape, and has a lower surface (hereinafter, also referred to as an "adapter lower surface") 22*a* and an outer side surface (hereinafter, also referred to as an "adapter outer side surface") 22*b* which are perpendicular to each other, and an upper surface (hereinafter, also referred to as an "adapter upper surface") 22*c* on the side opposite to the adapter lower surface 22*a*. The liquid storage pack 20 is housed in the case 30 so that the adapter lower surface 22*a* and the adapter outer side surface 22*b* face a bottom surface (hereinafter, also referred to as a "case bottom surface") 30*a* and an inner side surface (hereinafter, also referred to as a "case inner side surface") 30*b* of the case 30, respectively. When the liquid storage pack 20 is housed in the case 30, the adapter upper surface 22*c* becomes substantially the same plane as an upper surface (hereinafter, also referred to as a "case opening surface") 30*c* on the side opposite to the case bottom surface 30*a*. The liquid stored in the bag body 21 is introduced into the liquid ejection apparatus 1 through a liquid supply portion 23 exposed on the front surface of the adapter 22.

By the way, a plurality of liquid intake ports (not illustrated) for taking in the liquid introduced into the liquid ejection apparatus 1 is provided inside the bag body 21. These liquid intake ports are arranged vertically asymmetrically inside the bag body 21 in order to supply the liquid to the liquid ejection apparatus 1 at a uniform concentration over time, and therefore, the liquid storage pack 20 needs to be placed in the case 30 in a correct vertical direction. Therefore, in the present embodiment, as a positioning mechanism for housing the liquid storage pack 20 in the case 30 in the correct vertical direction, the adapter 22 of the liquid storage pack 20 is formed with concave portions 24, and the case 30 is formed with convex portions 31.

The concave portion 24 is formed on the adapter outer side surface 22*b* along a vertical direction (first direction), is open in the adapter lower surface 22*a* and the adapter upper surface 22*c*, and the convex portion 31 protrudes from the case inner side surface 30*b* and is formed on the entire case inner side surface 30*b* along the vertical direction. In addition, the concave portion 24 is formed asymmetrically with respect to a surface (surface parallel to the adapter upper surface 22*c* and the adapter lower surface 22*a*) that passes through the center of the adapter 22 in a height direction (vertical direction) and is perpendicular to the height direction of the adapter 22. Specifically, the concave portion 24 has a semi-circular truncated cone shape formed so that a sectional area perpendicular to the height direction of the adapter 22 (cross-sectional area) becomes smaller as the distance from the adapter lower surface 22*a* increases. With respect to this, the convex portion 31 has also a semi-circular truncated cone shape formed so that a sectional area perpendicular to the height direction (vertical direction) of the case 30 (cross-sectional area) becomes smaller as the distance from the case bottom surface 30*a* increases.

Figure 3:
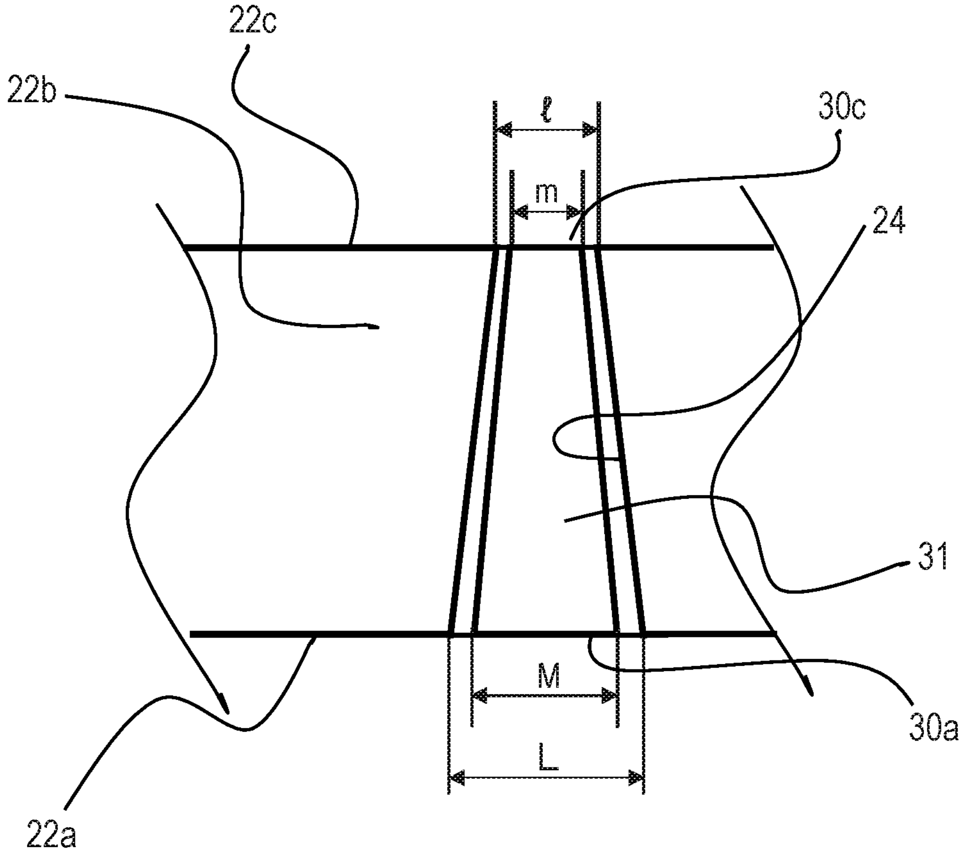
FIG. 3 is a schematic view partially illustrating a state of concave-convex engagement of the liquid storage unit of the first embodiment.

Here, with respect to the part A in FIG. 2, a schematic view of the state in which the adapter 22 is mounted on the case 30 as viewed from the direction of arrow a is illustrated in FIG. 3. In FIG. 3, when the opening dimension of the concave portion 24 on the side of the adapter lower surface 22*a* is L, the opening dimension of the concave portion 24 on side of the adapter upper surface 22*c* is $\ell$, the protrusion dimension of the convex portion 31 on the side of the bottom surface 30*a* of the case 30 is M, and the protrusion dimension of the convex portion 31 on the side of the case opening surface 30*c* is m, the respective dimensional relationships are $L>\ell$, $M>m$, $\ell>m$, and $L>M$. In this configuration, in particular, the relationship between the protrusion dimension M of the convex portion 31 on the side of the bottom surface 30*a* of the case 30 and the opening dimension $\ell$ of the concave portion 24 on the side of the adapter upper surface 22*c* is $M>\ell$.

Accordingly, even if the liquid storage pack 20 is to be housed in the case 30 in the opposite vertical direction, the concave portion 24 and the convex portion 31 do not properly engage with each other, so that the liquid storage pack 20 cannot even be sufficiently housed in the case 30. As a result, the liquid storage pack 20 can be easily housed in the case 30 in the correct vertical direction without the need for additional parts such as handles, for example.

In the illustrated example, both the concave portion 24 and the convex portion 31 are formed in a semi-circular truncated cone shape, but the shapes of the concave portion 24 and the convex portion 31 are not limited thereto. That is, in the illustrated example, the cross-sections of the concave portion 24 and the convex portion 31 perpendicular to the vertical direction are both semi-circular, but may be rectangular, for example. Alternatively, the shape of the concave portion 24 may be different on the right and left adapter outer side surfaces 22*b*, and the shape of the convex portion 31 may also be different on the right and left case inner side surfaces 30*b*. Further, the convex portion 31 may not be formed on the entire case inner side surface 30*b* as long as it can be engaged with the concave portion 24 in a front-rear direction (second direction). That is, the convex portion 31 may be formed on a part of the case inner side surface 30*b*, or may be formed only on an upper end of the case inner side surface 30*b* (end connected to the case opening surface 30*c*), for example. Further, for example, when the convex portion

31 is formed only in the lower region of the case inner side surface 30*b*, the concave portion 24 may also be formed only in the lower region of the adapter outer side surface 22*b*, that is, the concave portion 24 may not be open to the adapter upper surface 22*c*, and may be open only to the adapter lower surface 22*a*.

The concave portion 24 and the convex portion 31 also function as a guide mechanism for guiding the vertical insertion of the liquid storage pack 20 into the case 30. Therefore, from the viewpoint of ease of insertion, the concave portion 24 has preferably the diameter of the semicircle (maximum length in the front-rear direction) on the upper end surface (the adapter upper surface 22*c*) of 50% or less of the diameter of the semicircle on the lower end surface (the adapter lower surface 22*a*). Similarly, the convex portion 31 has preferably the diameter of the semicircle (maximum length in the front-rear direction) on the upper end surface (end surface on the side opposite to the case bottom surface 30*a*) of 50% or less of the diameter of the semicircle on the lower end surface (the case bottom surface 30*a*). Alternatively, when the liquid storage pack 20 is housed in the case 30, the gap between the concave portion 24 and the convex portion 31 is preferably 1 mm or more, that is, the difference between the diameter of the semicircle on the lower end surface of the concave portion 24 and the diameter of the semicircle on the upper end surface of the convex portion 31 is preferably 1 mm or more.

Second Embodiment

Figure 4:
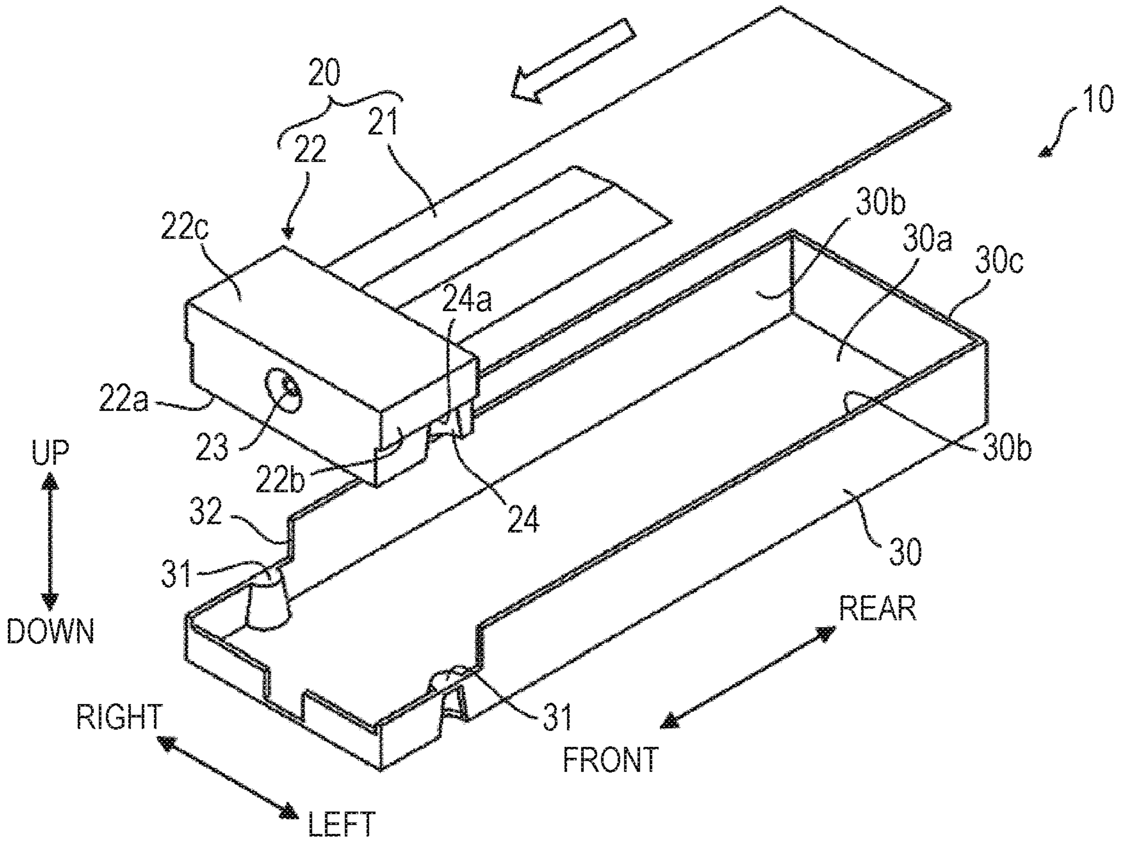
FIG. 4 is a perspective view of a liquid storage unit according to a second embodiment.

FIG. 4 is a perspective view of a liquid storage unit according to a second embodiment of the present invention, and illustrates a state in which a liquid storage pack is taken out of a case. Hereinafter, regarding the configurations similar to those of the first embodiment, the same reference numerals are given to the drawings and the description thereof will be omitted, and only the configurations different from those of the first embodiment will be described. Further, although not specifically mentioned, changes applicable to the first embodiment can be similarly made in the present embodiment.

In the present embodiment, the concave portion 24 is formed only in the lower region of the adapter outer side surface 22*b*. That is, the concave portion 24 is not open to the adapter upper surface 22*c*, but has an inner surface 24*a* facing the adapter lower surface 22*a*. In addition, on the adapter outer side surface 22*b*, the upper region in which the concave portion 24 is not formed protrudes outward in the right-left direction from the lower region in which the concave portion 24 is formed. With respect to this, the convex portion 31 is also formed only in the lower region of the case inner side surface 30*b*. That is, the convex portion 31 extends from the case bottom surface 30*a* along the height direction of the case 30 to a position facing the inner surface 24*a* of the concave portion 24 when the liquid storage pack 20 is housed in the case 30. In addition, the case 30 is formed with a notch 32 that exposes the upper region of the adapter outer side surface 22*b* to the outside when the liquid storage pack 20 is housed in the case 30. Thereby, in the present embodiment, in addition to the effect obtained in the first embodiment, when the liquid storage pack 20 is inserted into or removed from the case 30, the liquid storage pack 20 can be easily gripped in the upper region of the adapter outer side surface 22*b*, and its operability can be improved.

From the viewpoint of ease of gripping the liquid storage pack 20, the height (length in the vertical direction) of the upper region of the adapter outer side surface 22*b* is preferably 50% or more to 80% or less of the height of the entire adapter outer side surface 22*b*. Further, also in the present embodiment, from the viewpoint of ease of inserting the liquid storage pack 20 into the case 30, the concave portion 24 has preferably the diameter of the semicircle on the upper end surface (the inner surface 24*a*) of 50% or less of the diameter of the semicircle on the lower end surface (the adapter lower surface 22*a*). Similarly, the convex portion 31 has preferably the diameter of the semicircle on the upper end surface (position facing the inner surface 24*a* of the concave portion 24 when the liquid storage pack 20 is housed in the case 30) of 50% or less of the diameter of the semicircle on the lower end surface (the case bottom surface 30*a*). Alternatively, when the liquid storage pack 20 is housed in the case 30, the gap between the concave portion 24 and the convex portion 31 is preferably 1 mm or more, that is, the difference between the diameter of the semicircle on the lower end surface of the concave portion 24 and the diameter of the semicircle on the upper end surface of the convex portion 31 is preferably 1 mm or more.

If ease of gripping the liquid storage pack 20 is sufficiently ensured by the notch 32 formed in the case 30, the upper region of the adapter outer side surface 22*b* may not protrude outward in the right-left direction from the lower region thereof, that is, may be flat. Further, the concave portion 24 and the convex portion 31 may be omitted as long as the notch 32 is formed in the case 30 and the upper region of the adapter outer side surface 22*b* protrudes outward in the right-left direction from the lower region thereof.

Third Embodiment

Figure 5:
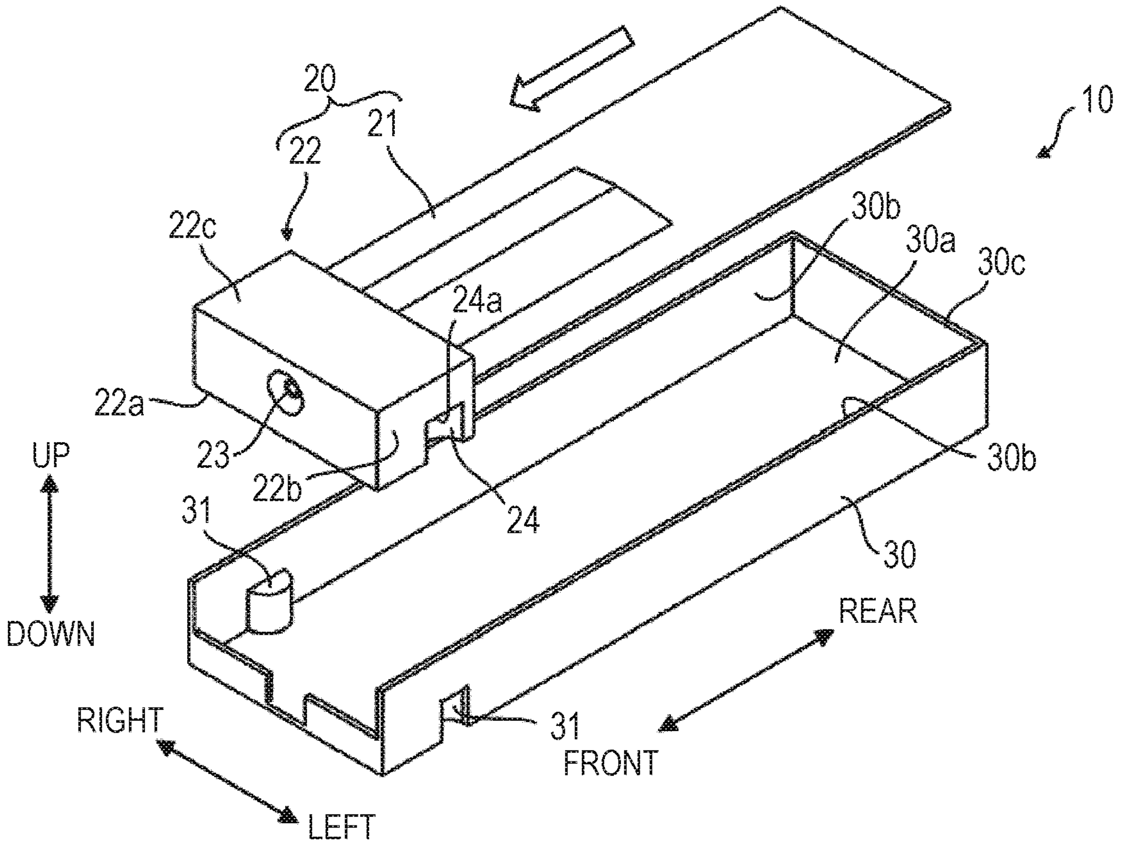
FIG. 5 is a perspective view of a liquid storage unit according to a third embodiment.

FIG. 5 is a perspective view of a liquid storage unit according to a third embodiment of the present invention, and illustrates a state in which a liquid storage pack is taken out of a case. Hereinafter, regarding the configurations similar to those of the above-described embodiment, the same reference numerals are given to the drawings and the description thereof will be omitted, and only the configurations different from those of the above-described embodiment will be described. Further, although not specifically mentioned, changes applicable to the above-described embodiment can be similarly made in the present embodiment.

In the present embodiment, the concave portion 24 is formed in a semi-cylindrical shape, that is, the cross-sectional area is constant, and the concave portion 24 is formed only in the lower region of the adapter outer side surface 22*b*. Further, the convex portion 31 is also formed in a semi-cylindrical shape, that is, the cross-sectional area is constant, and the convex portion 31 is formed only in the lower region of the case inner side surface 30*b*. That is, in the present embodiment, as in the first embodiment, the concave portion 24 and the convex portion 31 are formed asymmetrically in the vertical direction, whereby the liquid storage pack 20 can be easily housed in the case 30 in the correct vertical direction. From the viewpoint of reliably positioning the liquid storage pack 20 and the case 30, the height (length in the vertical direction) of the concave portion 24 is preferably 50% or more to 80% or less of the height of the entire adapter outer side surface 22*b*. Similarly, the height of the convex portion 31 is preferably 50% or more to 80% or less of the height of the entire case inner side surface 30*b*. Further, the convex portion 31 may be directed sideways so that both end surfaces of the semi-cylindrical shape face the front and rear.

Fourth Embodiment

Figure 6:
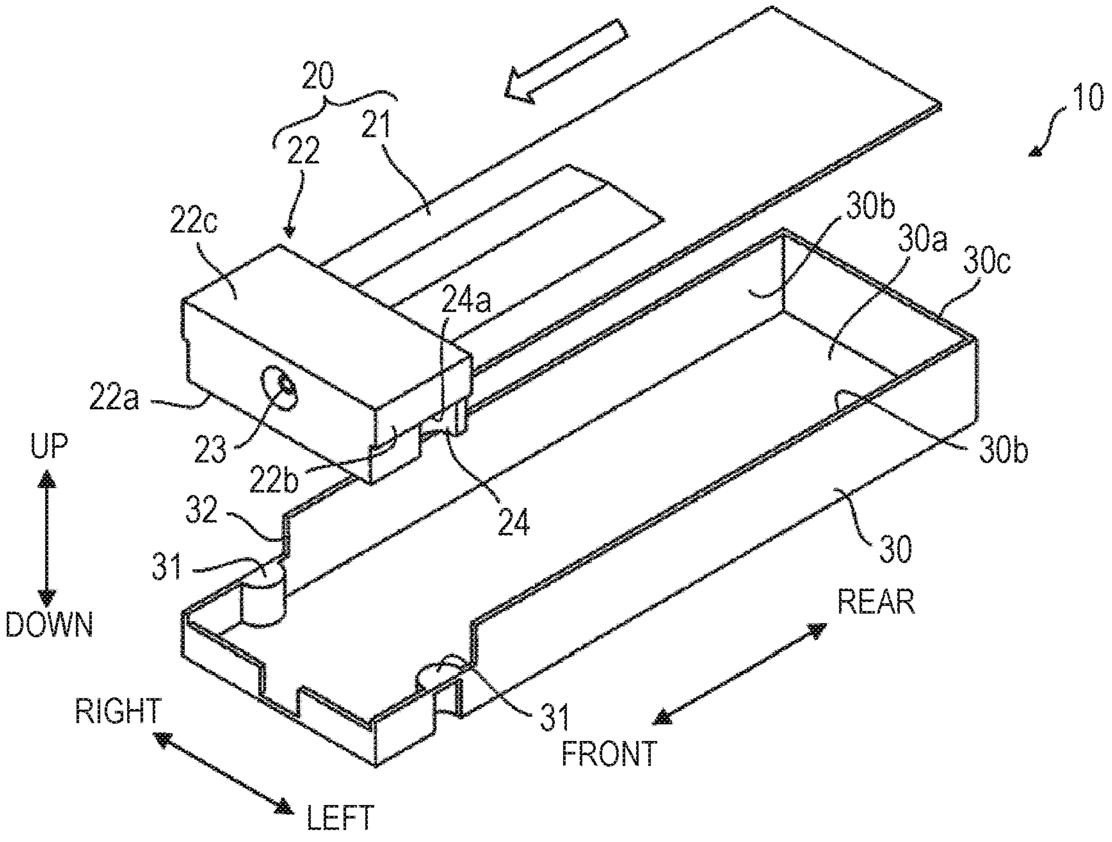
FIG. 6 is a perspective view of a liquid storage unit according to a fourth embodiment.

FIG. 6 is a perspective view of a liquid storage unit according to a fourth embodiment of the present invention, and illustrates a state in which a liquid storage pack is taken out of a case. Hereinafter, regarding the configurations similar to those of the above-described embodiment, the same reference numerals are given to the drawings and the description thereof will be omitted, and only the configurations different from those of the above-described embodiment will be described. Further, although not specifically mentioned, changes applicable to the above-described embodiment can be similarly made in the present embodiment.

The present embodiment is different from the third embodiment in that the upper region of the adapter outer side surface 22*b* in which the concave portion 24 is not formed protrudes outward in the right-left direction from the lower region thereof, and a notch 32 is formed in the case 30 correspondingly. Thereby, in the present embodiment, in addition to the effect obtained in the third embodiment, when the liquid storage pack 20 is inserted into or removed from the case 30, the liquid storage pack 20 can be easily gripped, and thus its operability can be improved, as in the second embodiment.

Next, the present invention will be described in more detail with reference to specific examples.

Example 1

In the present example, the liquid storage unit 10 illustrated in FIG. 2 was produced, and the liquid storage pack 20 was repeatedly inserted into and removed from the case 30 to evaluate its operability.

As the bag body 21 of the liquid storage pack 20, a bag body having a width (length in the right-left direction) of 60 mm and a depth (length in the front-rear direction) of 200 mm was prepared, and as the adapter 22, an adapter having a width of 76 mm, a depth of 40 mm and a height (length in the vertical direction) of 20 mm was prepared. Further, at a position in which the distance from the front surface of the adapter 22 was 28 mm, as the concave portion 24, a concave portion having a semi-circular truncated cone was formed in which the diameter of the semicircle on the upper end surface was 5.5 mm, the diameter of the semicircle on the lower end surface was 15.5 mm, and the height from the lower end surface to the upper end surface was 20 mm. Note that the distance from the front surface of the adapter 22 means the distance to the center of the cross-section of the concave portion 24 (the center of the semicircle in the present example) in the depth direction (front-rear direction), and this also applies when the cross-section of the concave portion 24 is not semi-circular (the same applies to the following examples). As the case 30, a case having a width of 80 mm, a depth of 250 mm, a height of 22 mm and a wall thickness of 2 mm was prepared. Further, at a position in which the distance from the front surface of the case 30 was 30 mm, as the convex portion 31, a convex portion having a semi-circular truncated cone was formed in which the diameter of the semicircle on the upper end surface was 5 mm, the diameter of the semicircle on the lower end surface was 15 mm, and the height from the lower end surface to the upper end surface was 20 mm. Note that the distance from the front surface of the case 30 means the distance to the center of the cross-section of the convex portion 31 (the center of the semicircle in the present example) in the depth direction (front-rear direction), and this also applies when the cross-section of the convex portion 31 is not semi-circular (the same applies to the following examples).

In such a liquid storage unit 10, the difference between the diameter (15.5 mm) of the semicircle on the lower end surface of the concave portion 24 and the diameter (5 mm) of the semicircle on the upper end surface of the convex portion 31 was sufficiently ensured. Accordingly, the liquid storage pack 20 could be easily inserted into the case 30. Not only it was possible to easily recognize the vertical direction in which the liquid storage pack 20 was to be housed in the case 30, but also it was not possible to house the liquid storage pack 20 in the case 30 in the direction opposite to the correct vertical direction.

Example 2

In the present example, the liquid storage unit 10 illustrated in FIG. 4 was produced and evaluated in the same manner as in Example 1.

As the bag body 21 of the liquid storage pack 20, the same one as that in Example 1 was prepared, and as the adapter 22, an adapter having a width of 76 mm, a depth of 40 mm, a height of 20 mm and a range of 10 mm from the adapter upper surface 22*c* protruding outward by 2 mm in the right-left direction was prepared. That is, the maximum width of the adapter 22 is 80 mm. Further, at a position in which the distance from the front surface of the adapter 22 was 28 mm, as the concave portion 24, a concave portion having a semi-circular truncated cone was formed in which the diameter of the semicircle on the upper end surface was 7.5 mm, the diameter of the semicircle on the lower end surface was 15.5 mm, and the height from the lower end surface to the upper end surface was 10 mm. As the case 30, the same one as that in Example 1 was prepared except that the shape of the convex portion 31 and the notch 32 were formed. That is, at a position in which the distance from the front surface of the case 30 was 30 mm, as the convex portion 31, a convex portion having a semi-circular truncated cone was formed in which the diameter of the semicircle on the upper end surface was 7 mm, the diameter of the semicircle on the lower end surface was 15 mm, and the height from the lower end surface to the upper end surface was 10 mm. The notch 32 was formed in the range of 40 mm from the front surface of the case 30 and 10 mm from the opening surface 30*c*.

In such a liquid storage unit 10, the difference between the diameter (15.5 mm) of the semicircle on the lower end surface of the concave portion 24 and the diameter (7 mm) of the semicircle on the upper end surface of the convex portion 31 was sufficiently ensured. Accordingly, the liquid storage pack 20 could be easily inserted into the case 30. Further, since the upper region (10 mm×40 mm) of the adapter outer side surface 22*b* was exposed from the case 30 when the liquid storage pack 20 was housed in the case 30, the ease of gripping the liquid storage pack 20 at the time of insertion or removal was also good. Not only it was possible to easily recognize the vertical direction in which the liquid storage pack 20 was to be housed in the case 30, but also it was not possible to house the liquid storage pack 20 in the case 30 in the direction opposite to the correct vertical direction.

Example 3

In the present example, the liquid storage unit 10 illustrated in FIG. 5 was produced and evaluated in the same manner as in Example 1.

As the bag body 21 and the adapter 22 of the liquid storage pack 20, the same ones as those in Example 1 were prepared except for the shape of the concave portion 24. That is, a semi-cylinder having a diameter of 15.5 mm and a height of 10 mm was formed as the concave portion 24 at a position in which the distance from the front surface of the adapter 22 was 28 mm. As the case 30, the same one as that in Example 1 was prepared except for the shape of the convex portion 31. That is, a semi-cylinder having a diameter of 15 mm and a height of 10 mm was formed as the convex portion 31 at a position in which the distance from the front surface of the case 30 was 30 mm.

In such a liquid storage unit 10, not only it was possible to easily recognize the vertical direction in which the liquid storage pack 20 was to be housed in the case 30, but also it was not possible to house the liquid storage pack 20 in the case 30 in the direction opposite to the correct vertical direction.

Example 4

In the present example, the liquid storage unit 10 illustrated in FIG. 6 was produced and evaluated in the same manner as in Example 1.

As the bag body 21 and the adapter 22 of the liquid storage pack 20, the same ones as those in Example 2 were prepared except for the shape of the concave portion 24. That is, a semi-cylinder having a diameter of 15.5 mm and a height of 10 mm was formed as the concave portion 24 at a position in which the distance from the front surface of the adapter 22 was 28 mm. As the case 30, the same one as that in Example 2 was prepared except for the shape of the convex portion 31. That is, a semi-cylinder having a diameter of 15 mm and a height of 10 mm was formed as the convex portion 31 at a position in which the distance from the front surface of the case 30 was 30 mm.

In such a liquid storage unit 10, since the upper region (10 mm×40 mm) of the adapter outer side surface 22*b* was exposed from the case 30 when the liquid storage pack 20 was housed in the case 30, the ease of gripping the liquid storage pack 20 at the time of insertion or removal was good. Not only it was possible to easily recognize the vertical direction in which the liquid storage pack 20 was to be housed in the case 30, but also it was not possible to house the liquid storage pack 20 in the case 30 in the direction opposite to the correct vertical direction.

Comparative Example

Figure 7:
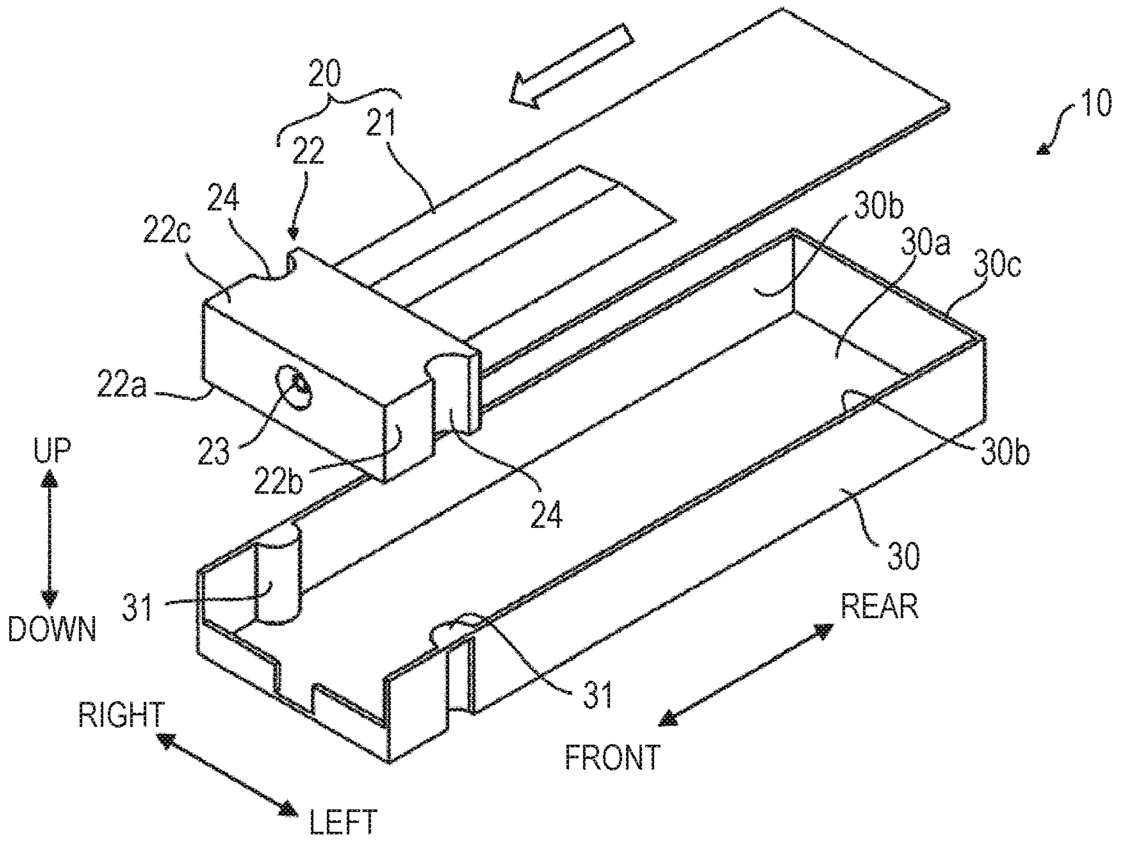
FIG. 7 is a perspective view of a liquid storage unit in a comparative example.

In the present comparative example, the liquid storage unit 10 illustrated in FIG. 7 was produced and evaluated in the same manner as in Example 1.

As the bag body 21 and the adapter 22 of the liquid storage pack 20, the same ones as those in Example 1 were prepared except for the shape of the concave portion 24. That is, a semi-cylinder having a diameter of 15.5 mm and a height of 20 mm was formed as the concave portion 24 at a position in which the distance from the front surface of the adapter 22 was 28 mm. As the case 30, the same one as that in Example 1 was prepared except for the shape of the convex portion 31. That is, a semi-cylinder having a diameter of 15 mm and a height of 20 mm was formed as the convex portion 31 at a position in which the distance from the front surface of the case 30 was 30 mm.

In such a liquid storage unit 10, it was not possible to easily recognize the vertical direction in which the liquid storage pack 20 was to be housed in the case 30, and the liquid storage pack 20 could be housed in the case 30 in the direction opposite to the correct vertical direction.

According to the present invention, it is possible to easily house the liquid storage pack in the case in the correct direction without the need for additional parts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-033478, filed Feb. 28, 2020, and Japanese Patent Application No. 2020-209977, filed Dec. 18, 2020, which are hereby incorporated by reference herein in their entirety.

What is claimed is:

1. A liquid storage unit comprising:

a case in which an opening is provided on one of rectangular parallelepiped maximum area surfaces; and a liquid storage pack that includes a flat bag body for storing a liquid and a rectangular parallelepiped adapter, and that is detachably mounted on an inside of the case through the opening, the adapter being attached to one end of the bag body and provided with a supply port of the liquid, wherein assuming that a direction connecting the opening of the case and a bottom surface facing the opening is a first direction, the adapter includes concave portions provided so as to extend in the first direction on opposite outer side surfaces, respectively, the outer side surface being a side surface continuous with a surface on which the supply port is provided, and not facing the bottom surface of the case, the case includes convex portions that complementarily fit to the concave portions on inner side surfaces of the case facing the outer side surfaces of the adapter on which the concave portions are provided, in a state in which the liquid storage pack is mounted, and the concave portions of the adapter and the convex portions of the case each have a semi-frustum shape.

2. The liquid storage unit according to claim 1, wherein the concave portion has a semi-frustum shape whose cross-sectional area perpendicular to the first direction becomes smaller from one surface of the adapter facing the bottom surface of the case toward the other surface facing the opening of the case, and the convex portion has a semi-frustum shape whose cross-sectional area perpendicular to the first direction becomes smaller from the bottom surface of the case toward the opening.

3. The liquid storage unit according to claim 2, wherein in the state in which the liquid storage pack is mounted on the case, when a concave opening dimension on a side of the one surface of the adapter is L, a concave opening dimension on a side of the other surface is $\ell$, a convex protrusion dimension on a side of the bottom surface of the case is M, and a convex protrusion dimension on a side of the opening is m, the respective dimensional relationships are:

$L>\ell$, $M>m$, $\ell>m$, $L>M$, and $M>\ell$.

4. The liquid storage unit according to claim 3, wherein ℓ is 50% or less of L and m is 50% or less of M.

5. The liquid storage unit according to claim 1, wherein the concave portion has a semi-circular truncated cone shape whose cross-sectional area perpendicular to the first direction becomes smaller from one surface of the adapter facing the bottom surface of the case toward the other surface facing the opening of the case, and the convex portion has a semi-circular truncated cone shape whose cross-sectional area perpendicular to the first direction becomes smaller from the bottom surface of the case toward the opening.

* * * * *